Aug. 31, 1943.  T. H. JACOB  2,328,343
ADJUSTABLE TRAILER HITCH
Filed May 31, 1941  2 Sheets-Sheet 1

INVENTOR
THOMAS H. JACOB
BY
ATTORNEYS

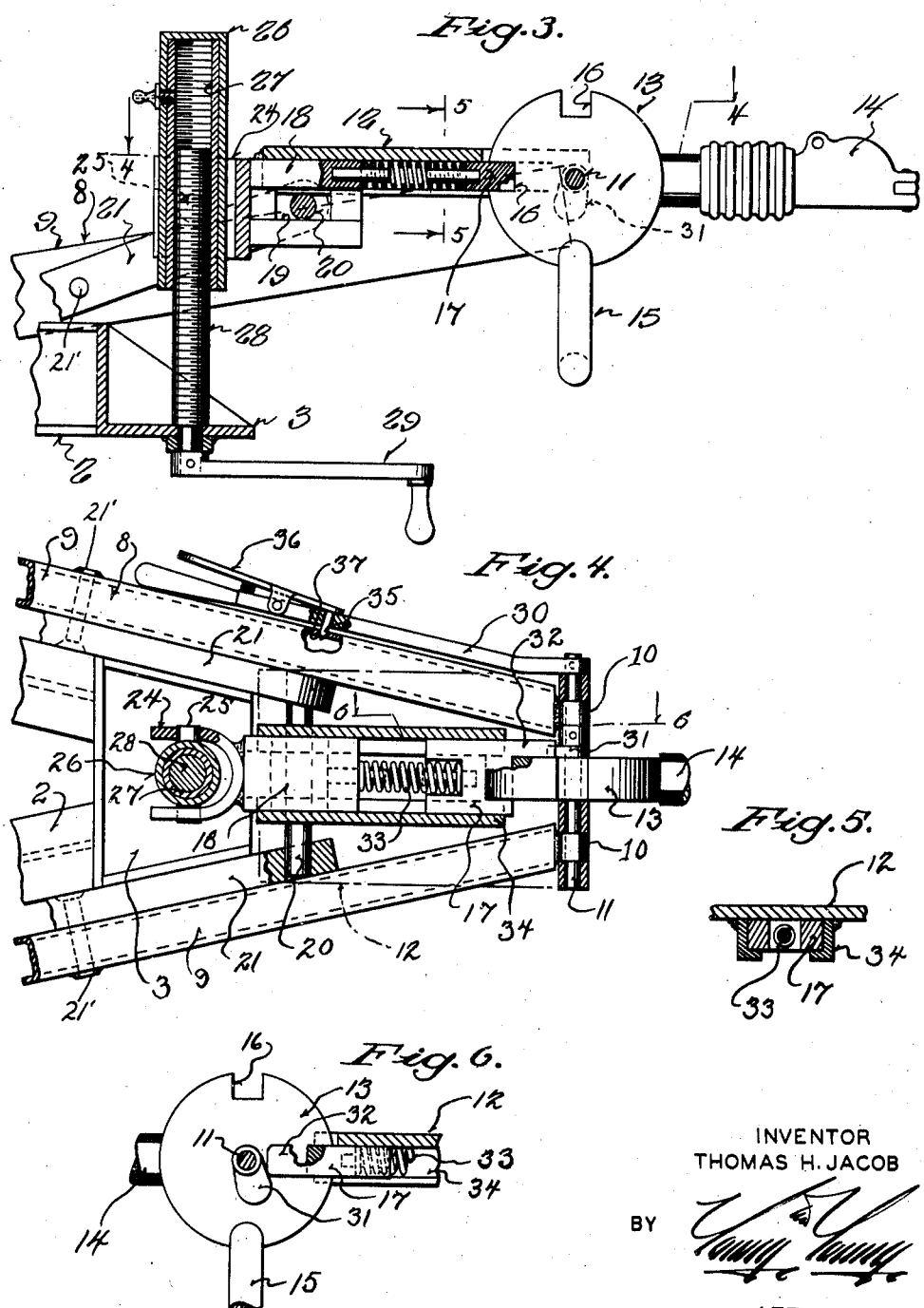

Patented Aug. 31, 1943

2,328,343

UNITED STATES PATENT OFFICE 2,328,343

ADJUSTABLE TRAILER HITCH

Thomas H. Jacob, Wausau, Wis.

Application May 31, 1941, Serial No. 396,073

3 Claims. (Cl. 280—33.44)

The present invention relates generally to trailers and more particularly to an improved trailer hitch.

Because of the extensive use of trailers today in both industrial and military fields for the transportation of a varied range of supplies and equipment, several serious problems are presented, one of which results from the difference in height of available drawbar couplings, and the other from the difference in the type of couplings encountered.

It is an accepted fact that in the economical operation of two-wheel trailers, the load must be balanced to maintain the trailer in a substantially horizontal position. At the same time, the hitch should afford a direct horizontal pull relative to the drawbar coupling. This is particularly true in connection with ball and socket hitches.

To meet the foregoing requirements, the present invention has primarily for its object the provision of a trailer having an adjustable hitch support to accommodate drawbar couplings positioned at different heights from the ground, and also maintain the hitch in a substantially horizontal position.

In connection with the foregoing, a more specific object resides in the provision of an auxiliary adjustable trailer tongue provided with a hitch support automatically maintained in level position upon vertical adjustment of the auxiliary tongue relative to the main frame.

Another object consists in the provision of an auxiliary tongue pivotally connected to the main frame of the trailer and provided with an adjustable self-leveling hitch support connected with both the auxiliary hitch tongue and trailer frame by a compensating lever mechanism.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 3 is an enlarged fragmentary sectional view taken on the line 3—3 of Figure 2.

Figure 4 is a plan view taken on the line 4—4 of Figure 3.

Figure 5 is a detail sectional view taken on the line 5—5 of Figure 3; and,

Figure 6 is a detail section taken on the line 6—6 of Figure 4.

Figure 1:
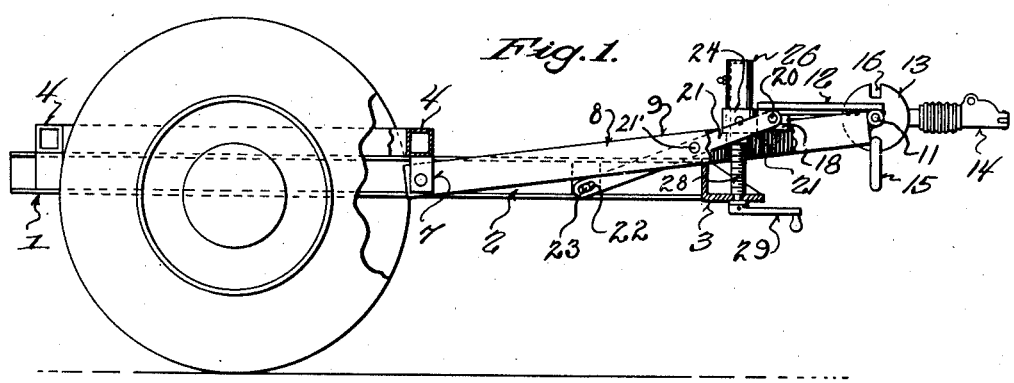
Figure 1 is an elevational view of a conventional two-wheel trailer equipped with the present invention, parts being broken away and in section to more closely illustrate structural details.
Figure 2:
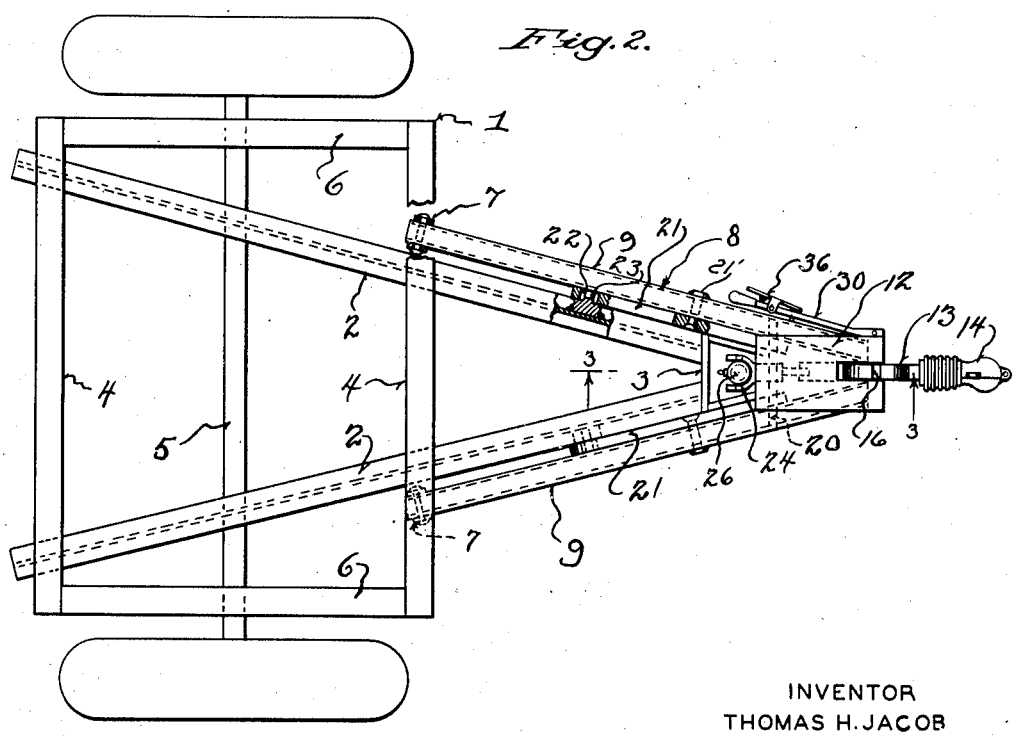
Figure 2 is a plan view with parts broken away and in section.

Referring now more particularly to the accompanying drawings the numeral 1 designates a main trailer frame consisting of longitudinal converging side arms 2 welded or otherwise secured at their forward ends to a head 3. Front and rear bunks 4 secured to the side arms 2 are supported upon a wheel axle 5 by leaf springs 6.

Pivotally connected to depending brackets 7 carried by the forward bunk is an auxiliary tongue 8 consisting of converging side arms 9, which at their forward ends, are provided with bearings 10 for reception of a connecting shaft 11. Pivotally mounted upon the shaft 11 is a self-leveling hitch plate 12, notched at its forward end to accommodate a hub 13, also loosely mounted on the shaft 11 and provided with selective hitches, such as a socket hitch 14 and a lunette ring 15. The hub 13 is provided with spaced notches 16 for reception of a locking plate 17, upon release of which, the hub 13 may be rotated to operatively present the selected hitch.

Secured to the lower face of the plate 12 adjacent its rear end, is a bracket 18 provided with an elongated opening 19 through which a pin 20, connecting the forward ends of a pair of compensating levers 21 extend. These levers 21 are pivotally connected intermediate their ends, by stub shafts 21' to the side arms 9 and the levers are provided at their lower ends with slots 22 for reception of pins 23 carried by said arms 2 of the trailer frame.

The bracket 18 is provided at its rear end with a spanner 24 for reception of pintles 25 carried by an adjustable sleeve 26. As best shown in Figure 3, the sleeve 26 is provided with a threaded bushing 27 for reception of a screw 28 carried by the head 3 connecting the forward ends of the side arms 2. A crank 29 is secured to the lower end of the screw 28 for manipulating the same, whereby the bracket and hitch plate 12 can be readily raised and lowered to the desired heights.

In operation of the device it is merely necessary to rotate the crank 29 in the proper direction to raise and lower the hitch plate 12 so that the selected hitch will be in the proper and desired position for engaging the companion hitch part carried by the pulling vehicle. As the hitch plate 12 raises or lowers, as the case may be, the same will be maintained in its level horizontal position due to the connection thereof with the compensating levers 21. These levers 21 will swing on their pivots during the adjustment of the hitch plate and, consequently, the pin 20 carried thereby will exert the desired pressure on the bracket 18.

The latch or locking plate 17 can be operated in any preferred manner and by referring to Figures 4 and 6, it can be seen that I have provided a hand lever 30 for this purpose. The hand lever 30 is keyed or otherwise secured to the cross shaft 11, and this shaft in turn has secured thereto an operating cam 31. The cam 31 is disposed in the path of an arm 32 formed on the latch plate 17, and, consequently, upon the turning of the shaft 11 by the hand lever, the cam 32 will push back the latch or locking plate 17 against the tension of an expansion spring 33 which normally urges the latch or locking plate 17 toward the hub 13.

The latch or locking plate 17 is mounted in suitable guides 34 carried by the under face of the hitch plate 12. To prevent accidental swinging movement of the hand lever 30, the same can be provided with a locking pin 35 carried by the forward end of a pivoted hand grip 36. One of the side bars 9 can be provided with a keeper opening 37 in which the lock pin is adapted to be received.

From the foregoing description, it can be seen that I have provided an especially simple and efficient device for maintaining the hitch in a predetermined relation relative to the trailing vehicle and the drawing vehicle.

Changes in details may be made, which do not depart from the spirit and scope of my claims, and what I claim as new is:

1. In a trailer including a main frame, a tongue pivotally connected to said frame, a hitch support pivotally connected to the end of said tongue having means for connection with a tractor coupling, means carried by the main frame and connected with said support for adjustment of said support relative to the main frame, and a compensating link connecting said support, tongue and main frame for maintaining said support and main frame substantially parallel and the main frame in substantially horizontal position, when the hitch support is connected to a tractor coupling regardless of the height of the tractor coupling from the ground.

2. In a trailer including a main frame, a tongue pivotally connected to said frame and projecting forwardly therefrom, a hitch support pivotally connected to said tongue, means carried by the main frame and connected with said support for raising and lowering said hitch support, and a link rockably mounted intermediate its ends upon said tongue having pivotal and sliding connection with the hitch support and with said main frame.

3. In a trailer including a main frame, having forwardly extending converging arms, a forwardly extending tongue pivotally secured to said arms at its rear end, a hitch support rockably mounted on the forward end of the tongue and extending rearwardly therefrom, an adjusting screw rotatably carried by the arms, a traveling nut on said screw, a yoke member pivotally connecting the hitch support to the traveling nut, a link rockably mounted intermediate its ends on the tongue, means pivotally and slidably connecting the forward end of the link to the hitch support in advance of the nut, and means pivotally and slidably connecting the link to the arms.

THOMAS H. JACOB.